United States Patent [19]

Ozaki et al.

[11] 4,437,357
[45] Mar. 20, 1984

[54] DOUBLE LEVER ASSEMBLY FOR BICYCLE SPEED CONTROL

[75] Inventors: Nobuo Ozaki; Mikio Hosokawa, both of Osaka, Japan

[73] Assignee: Maeda Industries, Ltd., Osaka, Japan

[21] Appl. No.: 325,125

[22] Filed: Nov. 27, 1981

[30] Foreign Application Priority Data

Nov. 28, 1980 [JP] Japan ................. 55-168393

[51] Int. Cl.³ ............... B62K 23/06; G05G 9/00; F16H 7/22
[52] U.S. Cl. ............... 74/475; 74/480 R; 74/501 R; 74/531; 474/81
[58] Field of Search ........... 74/473 R, 475, 480 R, 74/489, 501 R, 531; 474/81, 82

[56] References Cited

U.S. PATENT DOCUMENTS 4,046,025 9/1977 Ozaki ................. 74/501 R
4,155,270 5/1979 Juy ................... 74/475
4,156,371 5/1979 Juy ................... 74/489

Primary Examiner—Allan D. Hermann
Attorney, Agent, or Firm—Birch, Stewart, Kolasch & Birch

[57] ABSTRACT

In a double assembly for bicycle speed control including a first lever for operating a rear derailleur by means of a control cable in order to shift an endless drive chain from one rear sprocket to a selected rear sprocket of a multiple freewheel, and a second lever for operating a front derailleur by means of a further control cable in order to shift the chain from one front sprocket to another front sprocket of a chainwheel, pivotal motion of the first lever causes synchronous sliding motion of the second lever through a motion converting mechanism so as to automatically center a guide cage of the front derailleur over a chain line thereby to prevent the chain from hitting the inside of the guide cage.

3 Claims, 11 Drawing Figures

DOUBLE LEVER ASSEMBLY FOR BICYCLE SPEED CONTROL

BACKGROUND AND SUMMARY OF THE INVENTION

This invention relates to a bicycle speed control lever assembly, and more particularly to improvements in a so-called double lever type assembly which includes a first lever for operating a rear derailleur and a second lever for operating a front derailleur.

The double lever type assembly is utilized in such a multi-speed type of bicycles as equipped with a rear derailleur supported at the side of the rear wheel so as to cooperate with a multiple freewheel, and a front derailleur supported at the side of the pedals so as to cooperate with a multiple chainwheel. More particularly, as illustrated in FIG. 8, the multiple freewheel (A) generally comprises a plurality of (usually three to eight) different sized rear sprockets ($a_1, a_2, \ldots a_n$) mounted on the rear wheel axle, whereas the multiple chainwheel (B) generally comprises two or more (usually two to four) different sized front sprockets ($b_1, b_2, \ldots$).

The first lever ($L_1$) is operatively connected to the rear derailleur (R) by means of a known Bowden type control cable (W) consisting of a flexible sheath or outer wire ($w_1$) and a steel cable or inner wire ($w_2$) for adjustably positioning a guide pulley (G) of the derailleur (R) in order to guide an endless drive chain (C) at the rear, so that the chain (C) can be selectively switched over from one to another among the plurality of rear sprockets ($a_1, a_2, \ldots a_n$) of the freewheel (A), whereas the second lever ($L_2$) is likewise operatively connected to the front derailleur (F) by means of a further known control cable (W') consisting of an outer wire ($w_1'$) and an inner wire ($w_2'$) for adjustably positioning a front derailleur cage (T) having a pair of spaced, parallel-extending guide plates ($p_1, p_2$) to guide the chain at the front, so that the chain (C) can be switched over selectively from one to another among the plurality of front sprockets ($b_1, b_2, \ldots$) of the chain wheel (B). Thus, a desired multiple speed change system is achieved, wherein the number of available speeds is determined by multiplication of the number of rear sprockets ($a_1, a_2, \ldots a_n$) by the number of the front sprockets ($b_1, b_2, \ldots$).

As illustrated in FIG. 9 which shows variable positions of the running chain line (C), when the first lever ($L_1$) is manipulated to shift the chain (C) from the smallest sprocket ($a_n$) onto the largest sprocket ($a_1$) or vice versa, the chain line (C) is swung in the directions of the arrows P, Q about a given point on the chainwheel (B) to generate a sector bounded by the phantom lines as illustrated. As a result, the running chain (C) hits the inside of the guide plates ($p_1, p_2$) of the front derailleur cage (T) to cause not only uncomfortable noises but also wearing or abrasion in the plates. Therefore, with the conventional double lever assembly, the second lever ($L_2$) must be adjusted to center the guide cage (T) over the chain line (C) whenever the above-mentioned noises are made, because every conventional assembly is so constructed that the operation system of the first lever ($L_1$) associated with the rear derailleur (R) and that of the second lever ($L_2$) associated with the front derailleur (F) are completely independent from each other, as disclosed, for example, in U.S. Pat. No. 4,156,371 and U.S. Pat. No. 4,046,025.

Accordingly, the conventional double lever assembly has such particular disadvantages as follows: The first being that it requires a skilled handling technique for adjusting the second lever ($L_2$) to center the guide cage (T) over the chain line (C); the second being that it is too difficult for a cyclist to instantly distinguish the noise produced at the guide plate ($p_1$) from that produced at the other guide plate ($p_2$), in order to judge in which direction the lever ($L_2$) should be moved; the third being that it is dangerous for a cyclist to fix his eyes on the derailleur cage (T) during cycling in order to ascertain with which of the pair of the side plates ($p_1, p_2$) the chain (C) is in contact and to know in which direction the lever ($L_2$) should be turned; and the fourth being that necessity of frequently manipulating the first and second levers ($L_1, L_2$) during cycling tends to endanger the cyclist.

It is, therefore, an object of the present invention to eliminate the above-discussed disadvantages in the conventional double lever assembly.

Another object of the invention is to provide an improved double lever assembly which can minimize uncomfortable noise and undesirable wearing or abrasion at the guide cage of the front derailleur.

A further object of the invention is to provide an improved double lever assembly so constructed that a position adjustment of the front derailleur cage to the chain line can be automatically effected as the first lever (the rear derailleur control lever) is moved.

Other objects, features and advantages of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become obvious to those skilled in the art from this detailed description.

DETAILED DESCRIPTION OF THE PREFERRED EMBODIMENTS

Figure 2:
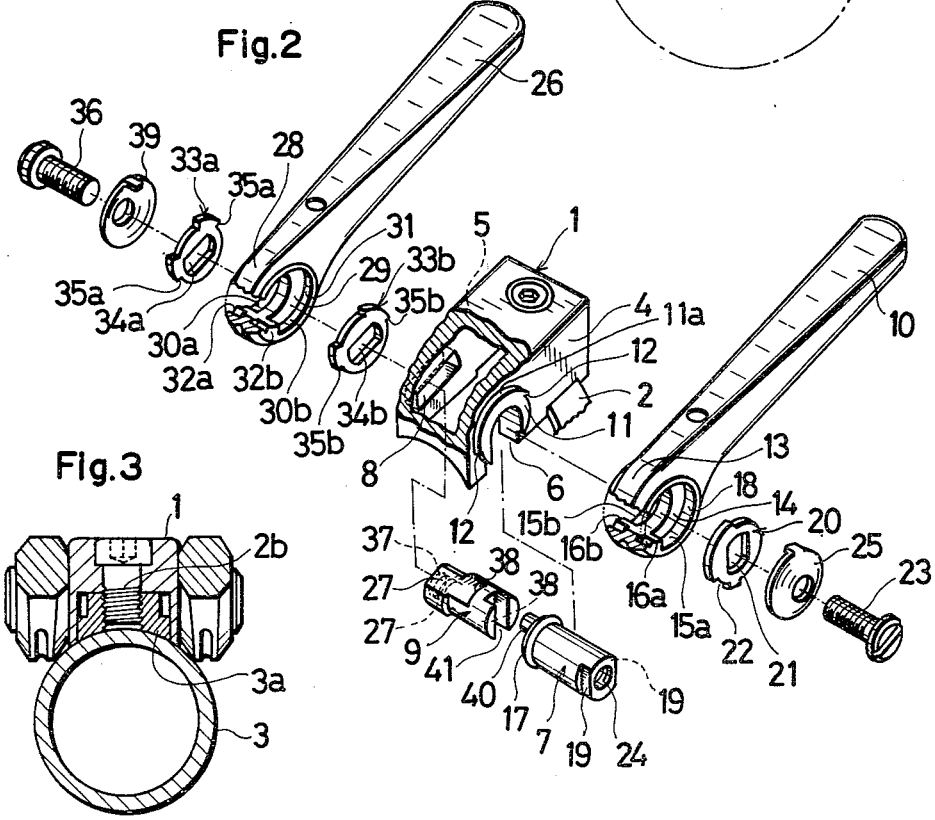
FIG. 2 is an exploded view of the lever assembly shown in FIG. 1.
Figure 3:
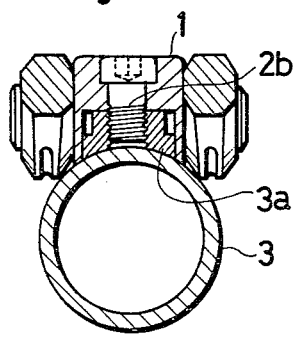
FIG. 3 is a cross section showing a modification of a mounting block.

Referring now to the drawings, the double lever assembly of the invention has a hollow block 1 to be fixedly mounted on a bicycle frame 3 by means of a known clamping band 2 (FIG. 2). The block may preferably be formed with an opening bottom for the convenience of easy assembly and mounting to the frame 3. Or otherwise, the block 1 may be mounted to the bicycle frame 3 by means of a bolt 2b and a nut 3a as illustrated in FIG. 3, wherein the bolt 2b is inserted through the block 1 while the nut 3a is welded to the bicycle frame 3.

Figure 1:
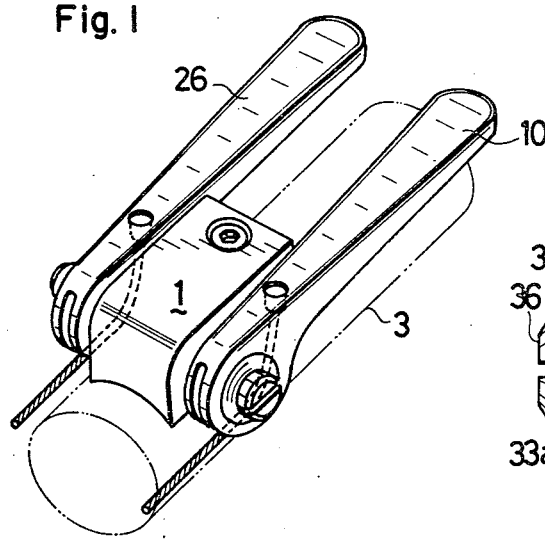
FIG. 1 is a perspective view of a double lever assembly according to the invention.
Figure 4:
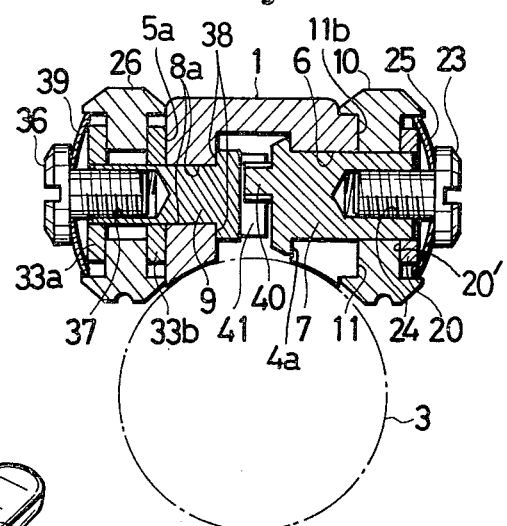
FIG. 4 is an enlarged cross section taken along the phantom lines of FIG. 2.

The block 1 comprises a pair of spaced, vertical side walls 4, 5 extending in parallel relationship with each other. The wall 4 is formed with a bore 6 in which a first lever supporting shaft 7 is rotatably supported. The bore 6 may be substantially semi-circular in shape and open at bottom. The first shaft 7 extends through the bore 6 into the inside of the block 1. The other wall 5 is formed with a slot 8 defined by a pair of spaced horizontal guide flats 8a (FIG. 4) extending transversely of the longitudinal axis of a second lever supporting shaft 9 which extends through the slot and is supported so as to be non-rotatably but slidably in the direction of the longitudinal axis of the slot 8. The second shaft 9 extends through the slot 8 into the inside of the block 1 for engagement at its inner extremity with the first shaft 7, as will be hereinafter described.

On the outer extremity of the first shaft 7 is mounted a first lever 10 for operating the rear derailleur (R) through the cable (W), so that the shaft 7 and the lever 10 can co-axially rotate together within a certain predetermined angular range, and so that the lever 10 can be frictionally retained in a selected speed gear position by such a retaining force (frictional resistance) as at least greater than the known tension force developed by a tension spring (not shown) at the rear derailleur (R) and always urging the lever 10 to move in one direction through the inner wire ($w_2$). This can be achieved in various ways, but may be realized, for example, as follows.

As illustrated, the side wall 4 of the block 1 is formed with a substantially semi-annular vertical platform 11 which has a substantially inverted U-shaped opening and surrounds the semi-circular bore 6. The platform 11 has a circular arc shaped cylindrical guide surface 11a and a pair of spaced, oppositely projecting claws 12 or stoppers formed at opposite sides of the guide surface 11a by partially cutting off the opposed sides of the periphery of the platform 11. One end portion 13 of the first lever 10 is formed with a circular bore 18 which extends coaxially of the first shaft 7 and is divided into two bore sections 15a, 15b by an intermediate annular partition flange 14 which extends radially inwardly of the bore 6, so that the internal diameter of the annular flange 6 corresponds to the external diameter of the first shaft 7. The outer bore section 15a has a small internal projection 16a extending radially inwardly of the bore 15a. The inner bore section 15b also has a small internal projection 16b which extends radially inwardly of the bore 16b so as to cooperate with the pair of claws 12 of the platform 11 for restricting the pivotal movement of the lever 10. The radius of the bore 16b should be so determined as to correspond to the radius of the circular arc of the guide surface 11a, so that the first lever 10 is pivotally moved about the platform 11. The angular movement of the lever 10 is restricted by abutment of the small projection 16b with the stoppers 12.

The inner extremity of the first shaft 7 is formed with an annular flange 17 which is in slidable contact at 4a with the side wall 4 when assembled. The flange 17 prevents the shaft 7 from slipping out of the bore 6 in the axial direction thereof. The outer extremity of the first shaft 7 should be so shaped as can be meshed with a hole 21 of a detent washer 20, so that the shaft 7 and the washer 20 can be co-rotatable within a certain predetermined angular range. For this purpose, the outer extremity of the shaft 7 may be formed, for example, with a pair of flats 19 which cooperate with a pair of corresponding internal flats defining the hole 21 of the detent washer 20.

The detent washer 20 is disposed within the outer bore section 15a with its inward flat wall surface 20' (FIG. 4) in abutment with the annular flange 14. The periphery of the washer 20 is formed with a notch 22 for receiving the small projection 16a formed internally of the bore section 15a. Thus, when assembled together, all of the first shaft 7, the washer 20 and the first lever 10 co-rotate together within the predetermined angular range.

The outer extremity of the first shaft 7 is formed with an axial threaded hole 24 which is engageable with an adjusting set screw 23. By the tightening the screw 23 after the first lever 10, the detent washer 20 and finally a cap nut or a spring washer type disk cover 25 (best shown in FIG. 2) have been mounted in order on the first shaft 7, the annular flange 14 of the lever 10 is adjustably pressed against the platform surface 11 of the block 1 at 11b (FIG. 4), with producing a certain friction (frictional retaining force or resistance) therebetween for retaining the lever 10 in a selected speed gear position of the freewheel (A) against the tension force developed at the rear derailleur (R) and transmitted to the lever 10 through the cable (W). This frictional retaining force can be easily adjusted by giving an adjusted turn to the screw 23. The range of the angular movement of the first lever 10 can be easily predetermined by varying a distance between the pair of spaced claws or stoppers 12. It should be understood, however, that the above described specific construction for mounting the first lever 10 to the first shaft 7 and the block 1 may be varied in many ways, and therefore, the spirit and scope of the invention should not be limited to the detailed construction of the specific example as described and illustrated.

A second lever 26 for operating the front derailleur (F) is rotatably mounted on the outer extremity of the second shaft 9 within a predetermined angular range, in such a manner that the lever 26 can be frictionally retained in a selected speed gear position of the chainwheel (B) against the known tension force developed by a known tension spring (not shown) at the front derailleur (F) and transmitted to the lever 26 through the control cable (W'). This can be achieved in various ways, but may be realized, for example, as follows:

As illustrated, the outer extremity of the second shaft 9 is formed with a pair of flats 27, which are in slidable contact with a pair of vertically spaced flats 8a of the slot 8, resulting in that the shaft 9 is not rotatable within the slot 8. As being substantially same with the first lever 10, one end portion 28 of the second lever 26 is formed with a circular bore 31 which extends axially of the second shaft 9 and is divided into two bore sections 30a, 30b by an intermediate annular partition flange 29 extending radially inwardly of the bore 31. The internal diameter of the annular flange 29 should correspond to the external diameter of the second shaft 9, so that the latter can be rotatably supported by the former. The outer bore section 30a has a small internal projection 32a extending radially inwardly of the bore 30a, while the inner bore section also has a small projection 32b which is substantially same with the aforesaid projection 32a in construction.

In order to restrict the pivotal movement of the second lever 26 within a predetermined angular range, a pair of detent washers 33a, 33b are provided which are of such size and configuration as can be disposed within the bore sections 30a, 30b. Either of a hole 34a of the washer 33a and a hole 34b of the washer 33b correspond in configuration to the flattened extremity of the second shaft 9, so that the washers 30a, 30b are not rotatable with relative to the shaft 9.

The washer 33a is formed on its periphery with a pair of circumferentially spaced stoppers 35a by cutting off parts of the periphery of the washer 33a, so that either of them is engageable with the projection 32a of the bore section 30a. Likewise, the other washer 33b is also formed on its periphery with a pair of circumferentially spaced stoppers 35b either of which is engageable with the projection 32b of the bore section 30b. Thus, when assembled, the second lever 26 is restricted in its angular movement by cooperation of the internal projections 32a, 32b of the lever 26 and the stoppers 35a, 35b of the washers 33a, 33b; and an axial displacement of the shaft 9 is prevented by a pair of shoulders 38 formed at an axially inward end of each of the flats 27 of the shaft 26.

The outer extremity of the second shaft 9 is also formed with an axial threaded hole 37 which is engageable with a further adjusting set screw 36. Thus, by tightening a further set screw 36 after the detent washer 33b, the second lever 26, the detent washer 33a and finally a further cap nut or a spring washer type disk cover 39 (best shown in FIG. 2) have been mounted in order on the second shaft 9, the detent washer 33b is pressed at 5a (FIG. 4) against the outer surface of the side wall 5 of the block 1 and, at the same time, the annular flange of the lever 26 is sandwiched between the pair of detent washers 33a, 33b with an adjustable frictional force produced thereby for retaining the lever 26 in a selected speed gear position at the chainwheel (B) against the known tension force developed at the front derailleur (F) and transmitted to the lever 26 through the cable (W'). This frictional retaining force can be easily adjusted by giving an adjusted turn to the set screw 36. The range of the angular movement of the second shaft 9 can be easily predetermined by varying a distance between the pair of circumferentially spaced stoppers 35a, 35b of the detent washers 33a, 33b. It also should be understood that the above described specific construction for mounting the second lever 26 to the second shaft 9 and the block 1 may be varied in many ways, and the detailed construction as illustrated and described are given by way of example only and are not limitative of the scope of the invention.

The opposed inner ends of the first and the second shafts 7, 9 are operatively inter-connected by means of such motion converting mechanism as can convert the rotational motion of the first shaft 7 into the reciprocating sliding motion of the second shaft 9. Various mechanism, for example, a piston and crank mechanism, and a rack and pinion mechanism, are known as the motion converting mechanism. However, among the various known mechanisms, a very simple one may preferably be utilized in the present invention. For example, in the illustrated embodiment, an eccentric pin 40 is formed with the inward end wall of the first shaft 7, so that the pin 40 is not co-axial with the shaft 7. The pin projects from the end wall of the shaft 7 and extends into slidable engagement with a diametrical guide groove 41 which is formed in the end wall of the second shaft 9, so that, as the first shaft 7 rotates about its axis, the eccentric pin 40 is slidably moved in the guide groove 41, resulting in that the second shaft 9 is forced to slide on the flats 8a (FIG. 4) of the shaft 8 in the directions along with the longitudinal axis of the slot 8.

Figure 7:
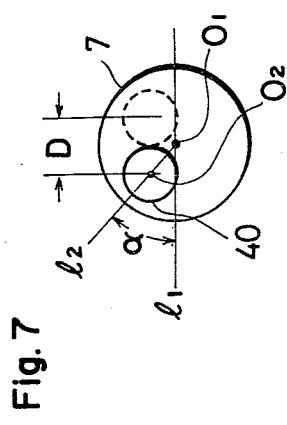
FIG. 7 is a diagram showing the principle on which the operation of the invention is based.
Figure 8:
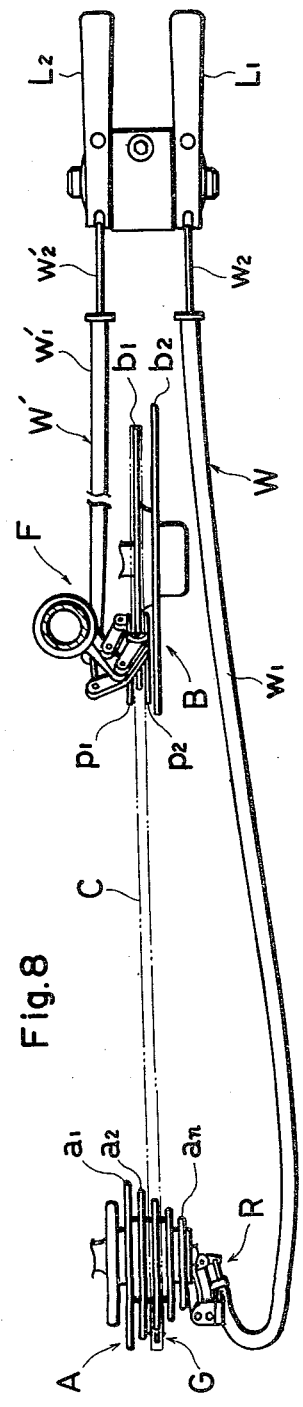
FIG. 8 is a schematic top plan view showing the general inter-relationship of the double lever assembly with the front derailleur, the multiple chainwheel, the rear derailleur, the multiple freewheel, and the control cables.

As particularly illustrated in FIG. 7, as the first lever 7 is pivotally moved, the first shaft 7 is rotated about its axis ($O_1$) while the axis ($O_2$) of the eccentric pin 40 moves around the axis ($O_1$). Since the pin 40 is in slidable engagement with the diametrical groove 41 of the second shaft 9, the shaft 9 is forced to slide back and forth within a certain distance (D) along the flats 8a of the slot 8 in the direction of the longitudinal axis of the slot 8, resulting in that the second lever 26, which is not relatively rotatable with respect to the shaft 9, is moved in the same direction together with the second shaft 9. The maximum value of the distance (D) can be easily predetermined by varying a distance between the axis ($O_1$) and the axis ($O_2$) or by varying an angle ($\alpha$) between a horizontal diametric line ($l_1$) and a line ($l_2$) which passes the center ($O_1$) of the shaft 7 and the center ($O_2$) of the pin 40.

FIGS. 4A and 4B illustrate the operation of one embodiment according to the invention, wherein the double lever assembly having the first and the second levers 10, 26 are utilized in such a type of bicycles as equipped with a so-called top-normal type rear derailleur (R) and a so-called low-normal type front derailleur (F). In this description, the term "a top-normal type rear derailleur" means such a type of rear derailleur as constructed so that, when the lever 10 is in its normal position (FIG. 5A) in which the wire ($w_2$) is not in tension, the chain (C) is in engagement with the smallest sprocket ($a_n$) (top gear) of the freewheel (A); and the term "a low-normal type front derailleur" means such a type of front derailleur as constructed so that, when the lever 26 is in its normal position (FIG. 5A) in which the wire ($w_2'$) is not in tension, the chain (C) is in engagement with smallest sprocket ($b_1$) (low gear) of the chainwheel (B). Incidently, the guide cage (T) should be adjusted beforehand to center over the chain (C) so that the chain (C) does not hit the inside of the guide plates ($p_1$, $p_2$) of the cage (T).

Figure 9:
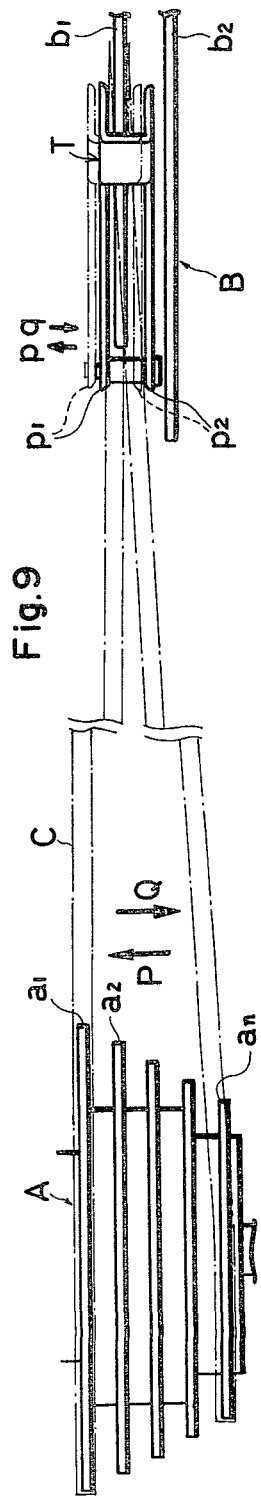
FIG. 9 is a top plan view showing the variable positions of the chain line extending between the chainwheel and the freewheel.

Thus, in operation, assuming that the chain (C) stays in engagement with one of the front sprockets ($b_1$, $b_2$, . . . ) of the chainwheel (B), when the first lever 10 is moved from the position of FIG. 4A to that of FIG. 4B in order to shift the chain (C) from the smallest sprocket ($a_n$) (top gear) of the freewheel (A) onto the largest sprocket ($a_1$) (low gear), the chain line (C) is swung in the direction of the arrow P as illustrated in FIG. 9. In this step, if the derailleur cage (T) stays in its original position, the chain (C) is expected to hit the inside of the guide plate ($p_1$) to make uncomfortable noises. However, according to the present invention, as the first lever 10 is turned, the second lever 26 is moved in synchronism with the turning motion of the first lever 10, so that the wire ($w_2'$) is automatically adjusted to slightly shift the front derailleur cage (T) in the direction of the arrow p (from the solid line position to the phantom line position in FIG. 9), with the result that undesirable contact of the chain (C) with the guide plate (b$_1$) can be prevented.

Figure 5A:
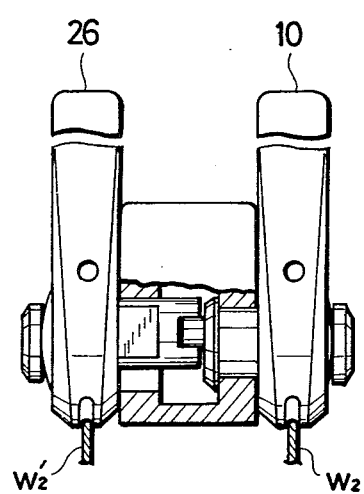
FIGS. 5A and 5B are front elevations, partly in section, showing operation in one embodiment of the invention.
Figure 5B:
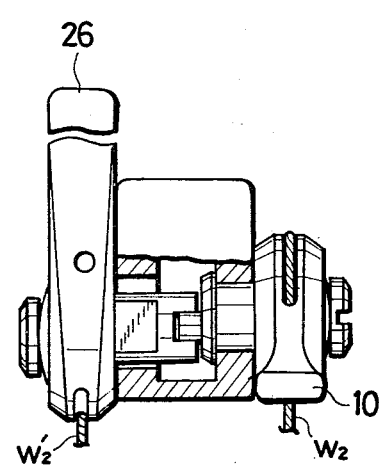

On the contrary, when the first lever 10 is turned in the reverse direction, that is, from the position of FIG. 5B to that of FIG. 5A, in order to shift the chain (C) from the largest sprocket (a$_1$) (low gear) onto the smallest sprocket (a$_n$) (top gear), the chain line (C) is swung in the direction of the arrow Q to hit the inside of the guide plate (p$_2$). In fact, however, as the first lever 10 is turned in reverse direction, the second lever 26 is moved in the reverse direction in synchronism with the reverse motion of the first lever 10, so that the wire (w$_2$') is automatically adjusted to slightly shift the front derailleur cage (T) in the direction of the arrow q (from the phantom line position to the solid line position in FIG. 9), with the result that the contact of the chain (C) with the inside of the guide plate (b$_2$) can be automatically prevented.

Figure 6A:
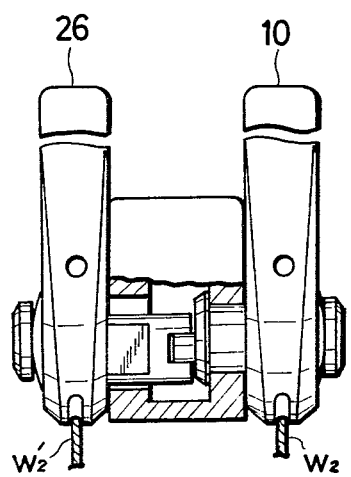
FIGS. 6A and 6B are similar views to FIGS. 5A and 5B but showing operation in another embodiment of the invention.
Figure 6B:
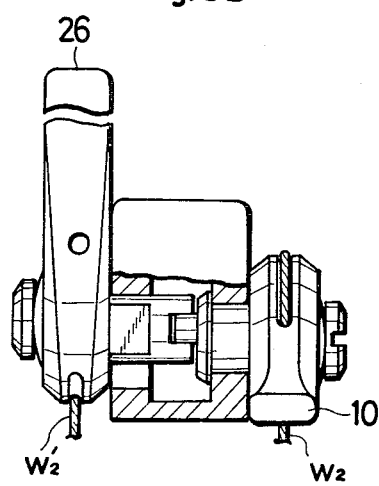

FIGS. 6A and 6B illustrate the operation of another embodiment according to the invention, wherein the double lever assembly having the first and the second levers 10, 26 are utilized in such a type of bicycles as equipped with a combination of a top-normal type rear derailleur and a top-normal type front derailleur or a combination of a low-normal type rear derailleur and a low-normal type front derailleur. Modification of the embodiment of FIGS. 5A, 5B into the embodiment of FIGS. 6A, 6B can be realized merely by turning the first shaft 7 for 180° when the shaft 7 is incorporated into the double lever assembly of the invention. The synchronized movement of the second lever 26 with the first lever 10 is carried out in the same manner as described in connection with the embodiment of FIGS. 5A and 5B.

The present invention being thus described, it will be obvious that same may be varied in many ways. Such variations are not to be regarded as a departure from the spirit and scope of the invention, and all such modifications as would be obvious to one skilled in the art are intended to be included within the scope of the following claims.

I claim:

1. A double lever assembly for bicycle speed control comprising
   a first shaft supported by a mounting block,
   a first or rear derailleur operating lever mounted on said first shaft,
   a second shaft supported by said mounting block,
   a second or front derailleur operating lever mounted on said second shaft, and
   said second shaft being inter-connected with said first shaft through motion converting mechanism so that said second lever is reciprocated within a limited range in synchronism with pivotal movement of said first lever.

2. The double lever assembly as defined in claim 1, which includes
   said mounting block including a first side wall having a bore formed therein and a second side wall having a slot formed therein,
   said first shaft being rotatably supported within said bore and extending through said bore,
   said first lever being mounted at one end on said first shaft,
   means for preventing relative rotation of said first lever with respect to said first shaft,
   means for restricting pivotal movement of said first lever within a predetermined angular range,
   means for frictionally retaining said first lever in a selected speed gear position,
   said second shaft being slidably supported within said slot and transversely extending through said slot,
   said second shaft being slidable back and forth with respect to a longitudinal axis of said slot,
   said second lever being mounted at one end on said second shaft,
   means for restricting pivotal movement of said second lever within a predetermined angular range,
   means for frictionally retaining said second lever in a selected speed gear position,
   said motion converting mechanism including means for converting rotational motion of said first shaft into reciprocating sliding motion of said second shaft, and
   said first and second shafts being inter-connected together through said motion converting mechanism so that pivotal movement of said first lever causes synchronized reciprocating sliding movement of said second lever.

3. The double lever assembly as defined in claims 1 or 2, wherein
   said motion converting mechanism comprises an eccentric pin formed with an internal end wall of said first shaft,
   said eccentric pin being not co-axial with said first shaft,
   a diametric guide groove formed in an internal end wall of said second shaft, and
   said eccentric pin projecting from said internal end wall of said first shaft and extending into slidable engagement with said diametric guide groove of said second shaft.

* * * * *